Oct. 10, 1967

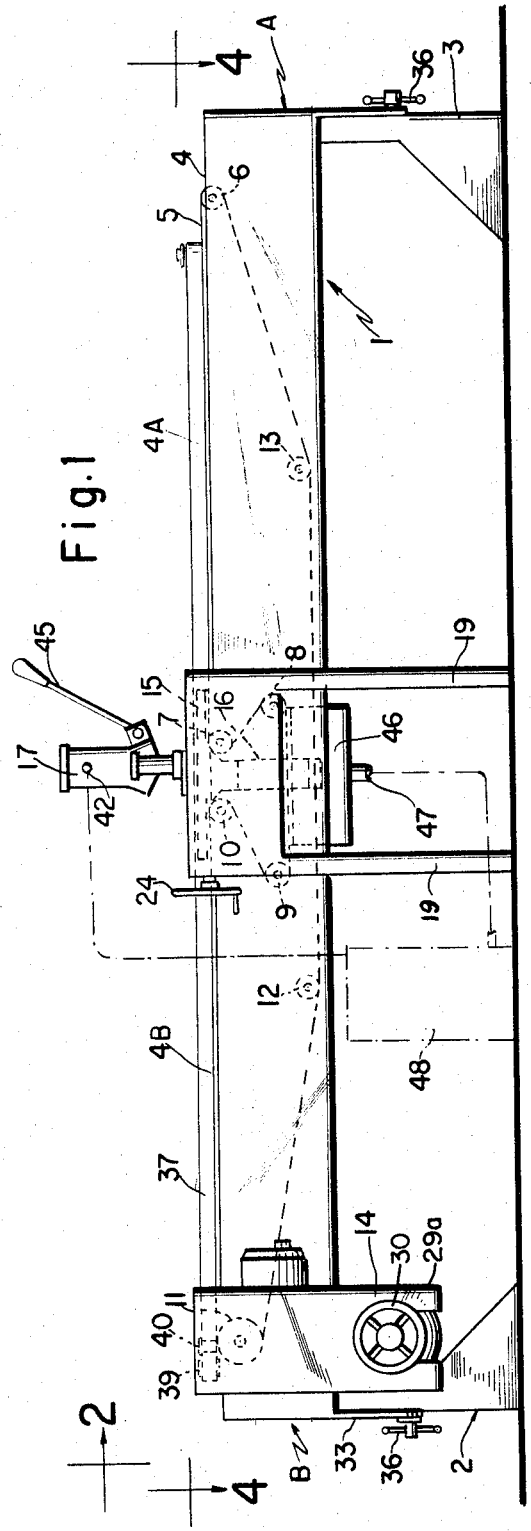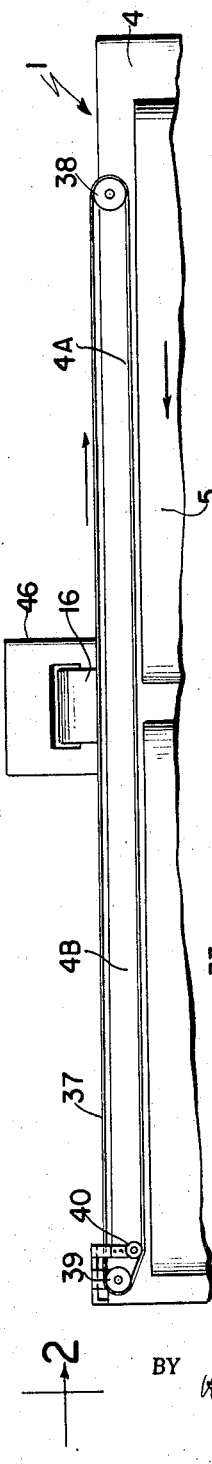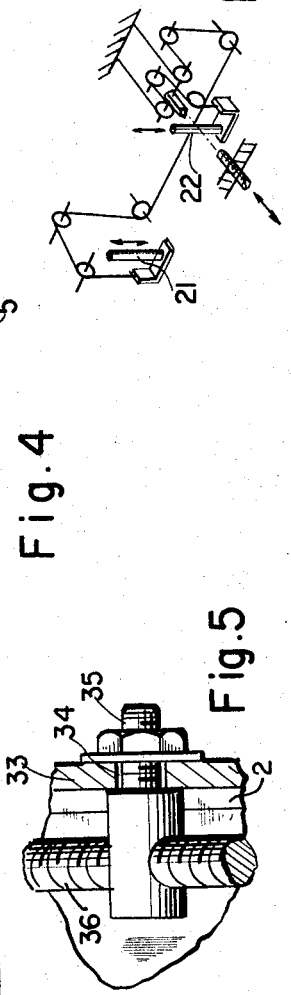

B. GLAUS 3,345,973

COATING APPARATUS WITH TILTING CONVEYOR

Filed Feb. 11, 1964

INVENTOR.
BERNHARD GLAUS

BY Hammond & Littell

ATTORNEYS ial upon a workpiece, having a configurated surface, which will overcome the above mentioned drawback, wherein the vibrations of the transport means are not transmitted to the pouring means.

United States Patent Office 3,345,973
Patented Oct. 10, 1967

3,345,973
COATING APPARATUS WITH
TILTING CONVEYOR
Bernhard Glaus, Saint Gall, Switzerland, assignor to Ulrich Steinemann A.G., Ltd., Saint Gall-Winkeln, Switzerland, a corporation of Switzerland
Filed Feb. 11, 1964, Ser. No. 344,121
8 Claims. (Cl. 118—324)

ABSTRACT OF THE DISCLOSURE

Describes a curtain coating machine in which a conveyor belt carries the objects to be coated through a falling curtain of coating material and in which the conveyor belt is tiltable and is mounted on supports which are independent of the supports for the falling coating curtain.

This invention relates to an apparatus for coating an object with paint, lacquer and the like. It more particularly relates to an apparatus which provides said coating material from a pouring head in the form of a continuously flowing, substantially vertical elongated curtain onto said object which is conveyed through said curtain, and having means to tilt said object at a desired angle.

Methods and machine for pouring a coating material such as varnish, lacquer, paint or the like, are known in which a workpiece is placed on a horizontally supported and horizontally movable table such as a conveyor belt or two serially arranged conveyor belts, and in which the workpiece moves below a lacquer discharge nozzle, while a lacquer collector trough is arranged below the said nozzle. Such a machine or apparatus is suitable for pouring a lacquer film upon a surface of a board or of a strip of sheet metal or the like which is flat across its width. If, however, the workpiece has a configurated surface, for example, if it comprises two surfaces which in the longitudinal direction of the workpiece form an angle with each other, as is the case for instance with frame or frieze moldings or skirting boards, the surfaces of such moldings or boards cannot be coated because one of said surfaces is horizontal while the other surface is disposed at a distinct angle with regard to the horizontal plane. The lacquer in some instances does not contact the surface inclined to the horizontal or if the inclination from the horizontal is substantial, the lacquer immediately drains off from the inclined surface whereas the lacquer on the horizontal surface or more nearly horizontal surfaces of the horizontal surface stays thereon and coats that part of the workpiece. Consequently, the lacquer film obtained in this way has a non-uniform thickness.

In United States Patent No. 2,935,424, an apparatus and method are shown wherein workpieces which have two or more surfaces inclined relative to each other in the longitudinal direction of the workpiece conveying means are moved underneath a lacquer discharging means in such a way that said inclined surfaces are placed at substantially the same angle with regard to the vertical plane, i.e., with regard to the direction of flow of the lacquer from said discharging means, or at any predetermined desired angle. The method according to the invention is preferably carried out by means of a machine in which a table supporting the workpiece passes underneath the discharging nozzle and is tiltable about an axis parallel with the direction of feed of the workpiece. The table is adapted to be adjusted to and held stationary at a desired angle transverse to the direction of feed of the workpiece.

In such an apparatus, the pouring means and workpiece transport means are integrally connected to the same supporting means. Therefore, vibrations from the motor which drives the work transport means are transmitted to the pouring means. This results in uneven coating on the workpiece.

It is, therefore, an object of the present invention to provide an improved device for pouring a coating material upon a workpiece, having a configurated surface, which will overcome the above mentioned drawback, wherein the vibrations of the transport means are not transmitted to the pouring means.

It is also an object of this invention to provide an apparatus for pouring a coating material on a workpiece, wherein the position of the workpiece supporting means may be varied with regard to a horizontal plane and in which the pouring means may be raised and lowered.

These and other objects and advantages of the invention will appear more clearly from the following specification in connection with the accompanying drawings, in which:

FIG. 1 is a side view of a coating material pouring machine according to the present invention.

FIG. 4 is a partial top view of the device shown in FIG. 1 taken along the lines 4—4 of FIG. 1, showing the workpiece retaining means.

FIG. 5 is a partial cross-section view taken along the lines 5—5 of FIG. 2 showing the locking means for tiltably supporting the workpiece supporting table.

FIG. 6 shows a diagrammatic perspective view of the means for raising the pouring head.

Figure 2:
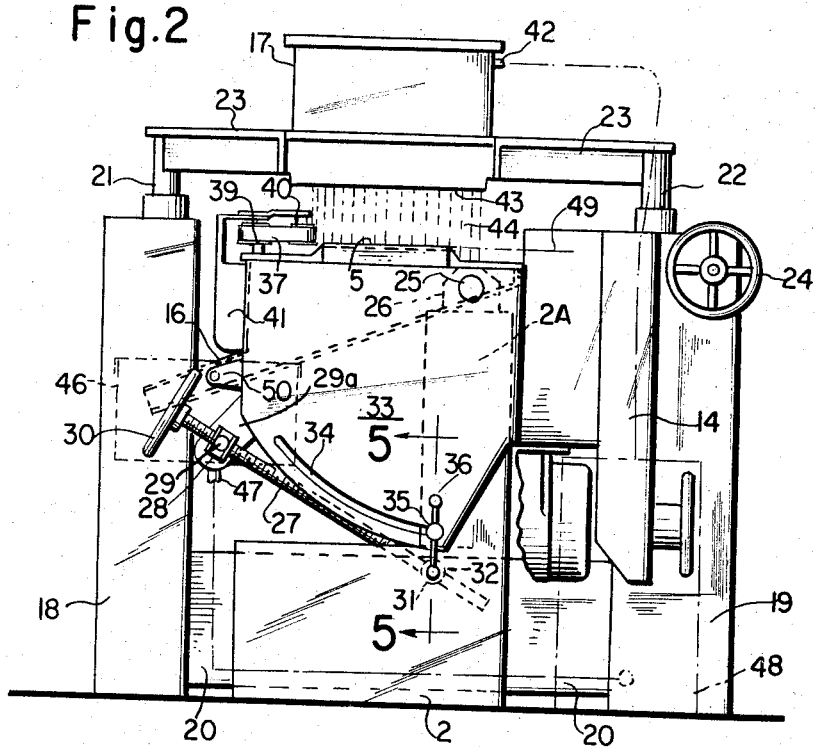
FIG. 2 is an end view of the machine of FIG. 1 as seen in the direction of end B.

Referring now to the drawings in detail and FIGS. 1 and 2 thereof in particular, the structure shown therein comprises a longitudinal frame 1 and two end supports 2 and 3, and a conveyor table 4. Conveyor belt 5 passes over rollers 6, 7, 8, 9, 10, 11, 12 and 13. The conveyor belt 5 is moved in the direction of end B by means of an infinitely variable drive means 14 of any standard type which drives the roller 11, for instance, by means of a V-belt or gear train, not shown. The drive means 14 is attached to end B of table frame 1, as shown in the figures. It could, however, be arranged in any other suitable manner. According to the present invention conveyor belt 5 is one continuous belt and passes over rollers 7, 8, 9 and 10, which are roughly rectangularly disposed with regard to each other. A space is thus formed so that a coating material collecting trough 16 may be inserted above the belt where it passes around rollers 8 and 9. Workpiece 15 will be freely moved by belt 5 over the gap made by collecting trough 16 between rollers 7 and 10. By this arrangement, the coating material passes through the gap between rollers 7 and 10 and is collected in trough 16, thus never coming into contact with belt 5.

The belt arrangement described has a further advantage in that only one drive is needed for the entire continuous belt. Thus, the belt over the two different table sections 4A and 4B of support table 4 is always moving at the same speed and there is no problem of synchronization as when separate belts are used for each of these sections.

Pouring head 17 is positioned above trough 16, and is supported transverse to table 4 in this position by supports 18 and 19 which may be braced at their base by any suitable means 20. Supports 18 and 19 are provided with shafts 21 and 22, respectively, each having brackets 23 connected to and supporting pouring head 17. Head 17 may be preferably removably mounted on brackets 23. Shafts 21 and 22 may be simultaneously raised and lowered within supports 18 and 19 by means diagrammatically, shown in FIG. 6, consisting of a cable and pulley arrangement controlled by handwheel 24. Thus, head 17 may be raised or lowered to control its height above conveyor table 4.

The supporting structure for head 17, i.e., supports 18 and 19 and braces 20, and the head itself do not touch the conveyor mechanism but are completely independent. Since there is no contact between the conveyor means and the pouring head structure, there is no possibility that vibrations from the moving conveyor can be passed to the pouring head to disturb the curtain of coating material or cause uneven coating of an object.

Figure 3:
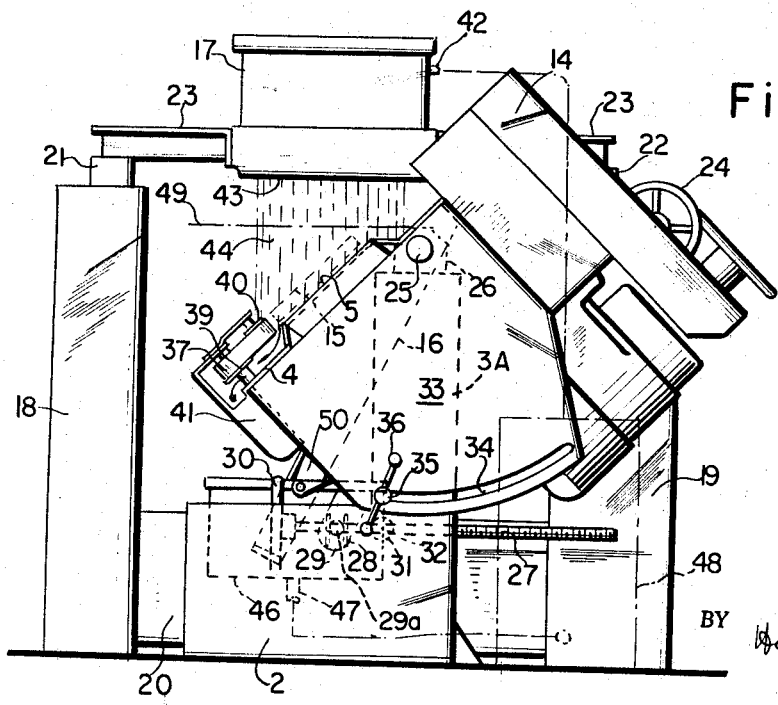
FIG. 3 illustrates the machine as shown in FIG. 2 with the work transport means in a tilted position.

In FIG. 2, conveyor table 4 is in a horizontal position. In FIG. 3, conveyor table 4 is shown tilted about a longitudinal axis. The angle of tilt is variable, the maximum tilt being about 45° from the horizontal. In order to be able to place conveyor table 4 and collecting trough 16 at an inclination, supports 2 and 3 have upright sections 2A and 3A on one side which support a shaft 25 in suitable bearings or journaling means 26.

Thus, the conveying system may be considered as two supports 2 and 3, joined by frame 1 and longitudinal shaft 25, and forming conveyor table 4. The conveyor unit constituting belt 5, rollers 6 through 13, inclusive, and drive means 14 is pivoted about staft 25. As a result thereof, the conveyor unit is adapted to be tilted at an angle transverse to the movement of belt 5, shown by the position indicated in FIG. 3. The tilting of the conveyor unit is effected in conformity with FIGS. 2 and 3 of the drawing by a threaded spindle 27 on support 2, which is journaled in a bearing 28, tiltable about trunnions 29, mounted in ears 29a secured to the tilting mechanism. It will thus be evident that the spindle 27 is rotatable by means of the handwheel 30. The support 2 of the conveyor table has connected thereto threaded nut 31 rotatably journaled in pivots 32 in support 2. The thread of spindle 27 engages the threaded nut 31 and by means of the trunnions 29 and pivots 32, respectively, of the bearing 28 and the threated nut 31, spindle 27 will be able, when tilting the conveyor unit to adjust itself accordingly.

For maintaining the conveyor frame 1 at a desired angle of inclination locking means are provided at ends A and B, as shown in FIGS. 2 and 3. The end plate 33 of frame 1 is extended downward and has a slot 34 describing an arc with a center at shaft 25. A threaded bolt 36 is mounted on support 2 and projects through slot 34. A locking handle 36 on bolt 35 can be tightened to clamp against the edges of slot 34 in plate 33 to provide locking the frame 1 at any desired angle. Support 3 has a similar arrangement to provide additional stability in locking.

In order to prevent objects sliding off conveyor belt 5 when frame 1 is inclined, a guide belt 37 is provided along the inclined edge. This is a narrow, continuous belt which moves around rollers 38 and 39. A small tension adjusting roller 40 may also be provided. Rollers 38 and 39 are mounted on vertical shafts on the horizontal conveyor table 4. Belt 37 is driven by roller 39 which is gear driven and synchronized with belt 5. On the inclined side of table 4, channel 41 receives the coating material flowing transversely on an inclined workpiece or on table 4. A workpiece 15 (see FIG. 3) on inclined belt 4 will make contact on its edge with belt 37. Belt 5 and belt 37, on the surfaces which touch workpiece 15, move towards end B, thus transporting the workpiece. Thus, belt 37 guides the workpiece synchronously with the belt 5, and prevents the inclined workpiece from sliding off belt 5. The movement of belt 37 prevents friction or drag which would result from using a simple vertical fixed rim in its place.

In operation, a coating material is pumped to enclosed pouring head 17 through line 42 (shown in dashed lines). The coating material flows through a longitudinal slot 43 as a continuous, substantially vertical curtain 44. Slot 43 is adjustable in width by means of handle 45. A workpiece 15 is conveyed on belt 5 from end A towards end B and passes through curtain 44, thus receiving a uniform coat over its entire surface. Coating material not deposited on the workpiece flows into trough 16 which discharges into tank 46. From tank 46, the coating material flows through line 47 (shown in dashed lines) to portable pump and tank unit 48, (shown in FIG. 1 in dashed lines), and this material is again pumped to the pouring head 17. Thus, coating material collected by trough 16 is recycled in the process.

As previously pointed out, workpieces which have surfaces other than horizontal may not receive an even coating on all surfaces, and vertical surfaces may receive practically no coating material. To take care of this, belt 5 and its supporting rollers and drive means may be inclined, whereby the workpiece is also inclined with respect to the horizontal contact line 49, of the flowing coating curtain 44 (see FIGS. 2 and 3). The angle of inclination can be varied as required by the configuration of the workpiece.

When inclination is required, locking handles 36 are loosened and handle 30 turn spindle 27 to adjust table 4 to the desired inclination then locking handles 36 are tightened. The workpiece is carried through curtain 44 by belt 5 and is guided in position by belt 37. The overflow coating material will partly run off table 4 and belt 5 and this material is discharged into a channel 41 which in turn discharges into tank 46. Tank 46 is pivotally mounted to frame 1 by brackets 50 so that this tank is always horizontal regardless of the inclination of frame 1. The cover of tank 46 is shaped so that trough 16 discharges into the tank at any angle of inclination of the conveyor frame.

In a preferred embodiment of my invention, head 17, trough 16, tank 46 and pump unit 48 are readily removable so that a change of coating material may be readily effected and these parts may be readily cleaned.

While the workpiece 15 has been shown as a plane sided structure it will be understood that with frame moldings or frieze moldings and skirting boards, the workpieces will have more intricate configurations and that the tilting and coating of such workpieces with a substantially uniform layer of the coating composition is within the contemplation of this invention.

It is, of course, to be understood that the present invention is not limited to the particular construction shown in the drawings which represent certain specific embodiments but may be changed or modified wtihout departing from the spirit of the disclosure or the scope of the appended claims.

I claim:

1. In a curtain coating apparatus for coating a workpiece having a configurated surface, a fluid coating material discharging vessel comprising means to support said vessel, feeding means including a belt conveyor operable to feed a workpiece underneath said discharging vessel comprising supporting means independent of said vessel support means, wherein said discharge vessel and the supports thereof are independent of said feeding means and the supports thereof, means for tilting said conveyor belt feeding means and selectively varying the tilting angle thereof and the angle of the belt in a direction transverse to the feeding movement of said feeding means and also for securing said feeding means in a tilted position, infinitely variable drive means mounted on the tilting means and movable therewith for varying the speed of the conveyor belt when in either tilted or horizontal position and guiding means adjacent said feeding means moving in synchrony therewith and supported thereby for supporting a workpiece in position on said feeding means in a tilted position.

2. In a curtain coating apparatus for coating a workpiece having a configurated surface, a fluid coating material discharging vessel having a longitudinal discharge slot for discharging said coating material as a substantially vertical curtain, means to support said vessel, feeding means including a belt conveyor operable to feed a workpiece underneath said discharging vessel and through said curtain comprising supporting means independent of said vessel support means, wherein said discharge vessel and the supports thereof are independent of said feeding means and the supports thereof, means for tilting said conveyor belt feeding means and selectively varying the tilting angle thereof and the angle of the belt in a direction transverse to the feeding movement of said feeding means and also for securing said feeding means in a tilted position, infinitely variable drive means mounted on the tilting means and movable therewith for varying the speed of the conveyor belt when in either tilted or horizontal position and guiding means adjacent said feeding means moving in synchrony therewith and supported thereby for supporting a workpiece in position on said feeding means in a tilted position.

3. In a curtain coating apparatus for coating a workpiece having a configurated surface, a pouring head movably mounted on supports, feeding means including a belt conveyor operable to feed a workpiece underneath said pouring head comprising supporting means independent of said pouring head supporting means, wherein said pouring head and its supports are independent of said feeding means and its supports, means for varying the elevation of said pouring head above said feeding means, means for tilting said conveyor belt feeding means and selectively varying the tilting angle thereof and the angle of the belt in a direction transverse to the feeding movement of said feeding means and also for securing said feeding means in a tilted position, infinitely variable drive means mounted on the tilting means and movable therewith for varying the speed of the conveyor belt when in either tilted or horizontal position and guiding and conveying means adjacent said feeding means, supported thereby and driven in synchrony therewith for supporting a workpiece in position on said feeding means in the tilted position.

4. In a curtain coating apparatus for coating a workpiece having a configurated surface, a pouring head movably mounted on supports, feeding means including a belt conveyor operable to feed a workpiece underneath said pouring head comprising supporting means independent of said pouring head supporting means, wherein said pouring head and its supports are independent of said feeding means and its supports, means for varying the elevation of said pouring head above said feeding means, means for tilting said conveyor belt feeding means and selectivity varying the tilting angle thereof and the angle of the belt in a direction transverse to the feeding movement of said feeding means and also for securing said feeding means in a tilted position, infinitely variable drive means mounted on the tilting means and movable therewith for varying the speed of the conveyor belt when in either tilted or horizontal position and guiding and conveying means adjacent said feeding means, supported thereby and driven in sychrony therewith for supporting a workpiece in position on said feeding means in the tilted position, said guiding means comprising a continuous, moving belt.

5. In a curtain coating apparatus for coating a workpiece having a configurated surface, a pouring head movably mounted on supports, continuous belt feeding means including a belt conveyor operable to feed a workpiece underneath said pouring head comprising supporting means independent of said pouring head supporting means, wherein said pouring head and its supports are independent of said feeding means and its supports, means for varying the elevation of said pouring head above said feeding means, means for tilting said conveyor belt feeding means and selectively varying the tilting angle thereof and the angle of the belt in a direction transverse to the feeding movement of said feeding means and also for securing said feeding means in a tilted position, infinitely variable drive means mounted on the tilting means and movable therewith for varying the speed of the conveyor belt when in either tilted or horizontal position and guiding and conveying means adjacent said feeding means, supported thereby and driven in synchrony therewith for supporting a workpiece in position on said feeding means in the tilted position, said guiding and conveying means comprising a continuous, moving belt.

6. In a curtain coating apparatus for coating a workpiece having a configurated surface, a pouring head movably mounted on supports, feeding means including a belt conveyor operable to feed a workpiece underneath said pouring head, comprising supporting means independent of said pouring head supporting means, wherein said pouring head and its supports are independent of said feeding means and its supports, means to collect the discharge from said pouring head, associated with said feeding means, means to recycle the discharge to said pouring head, means for varying the elevation of said pouring head above said feeding means, said feeding means comprising a continuous belt passing under said collecting means, means for tilting said conveyor belt feeding means and selectively varying the tilting angle thereof and the angle of the belt in a direction transverse to the feeding movement of said feeding means and also for securing said feeding means in a tilted position, infinitely variable drive means mounted on the tilting means and movable therewith for varying the speed of the conveyor belt when in either tilted or horizontal position and guiding and conveying means, adjacent said feeding means supported thereby and driven in synchrony therewith for supporting a workpiece in position on said feeding means in the tilted position.

7. In a curtain coating apparatus for coating a workpiece having a configurated surface, a pouring head movably mounted on supports, feeding means including a belt conveyor operable to feed a workpiece underneath said pouring head, means associated with said feeding means for collecting the discharge from said pouring head comprising a trough discharging into a receptacle, means to recycle the discharge to said pouring head, supporting means for said feeding means independent of said pouring head supporting means, wherein said pouring head and its supports are independent of said feeding means and its supports, means for varying the elevation of said pouring head above said feeding means, said feeding means comprising a continuous belt passing under said collecting means, means for tilting said conveyor belt feeding means and selectively varying the tilting angle thereof and the angle of the belt in a direction transverse to the feeding movement of said feeding means and also for securing said feeding means in a tilted position, means to maintain said receptacle level while said feeding means is tilted, infinitely variable drive means mounted on the tilting means and movable therewith for varying the speed of the conveyor belt when in either tilted or horizontal position and guiding and conveying means adjacent said feeding means, supported thereby and driven in synchrony therewith for supporting a workpiece in position on said feeding means in the tilted position.

8. In a curtain coating apparatus for coating a workpiece having a configurated surface, a pouring head movably mounted on supports, feeding means including a belt conveyor operable to feed a workpiece underneath said pouring head, means associated with said feeding means for collecting the discharge from said pouring head comprising a trough discharging into a receptacle, means to recycle the discharge to said pouring head, comprising a tank and pump unit removably connected to said receptacle and said pouring head, supporting means for said feeding means independent of said pouring head supporting means, wherein said pouring head and its supports are independent of said feeding means and its supports, means for varying the elevation of said pouring head above said feeding means, said feeding means comprising a continuous belt passing under said collecting means, means for tilting said conveyor belt feeding means and selectively varying the tilting angle thereof and the angle of the belt in a direction transverse to the feeding movement of said feeding means and also for securing said feeding means in a tilted position, means to maintain said receptacle level while said feeding means is tilted, infinitely variable drive means mounted on the tilting means and movable therewith for varying the speed of the conveyor belt when in either tilted or horizontal position and guiding and conveying means, adjacent said feeding means supported thereby and driven in synchrony therewith for supporting a workpiece in position on said feeding means in the tilted position, said guiding and conveying means comprising a continuous moving belt.

References Cited

UNITED STATES PATENTS

| 2,795,516 | 6/1957 | Miller | 118—324 X |
| 2,880,695 | 4/1959 | Timmons | 113—324 X |
| 2,935,424 | 5/1960 | Glaus | 118—324 X |
| 3,132,078 | 5/1964 | Wandtke | 113—324 X |
| 3,245,380 | 4/1966 | Carroll | 118—324 |

OTHER REFERENCES

The George Koch Sons Corp. catalogue, pp. 15–18.

DANIEL BLUM, *Primary Examiner.*